May 19, 1964

C. E. BOLDEN 3,133,631

CASE AND SLIDE RULE HOLDER THEREON

Filed Sept. 22, 1961

INVENTOR.
CHARLES E. BOLDEN,
BY
McMorrow, Berman & Davidson
ATTORNEYS.

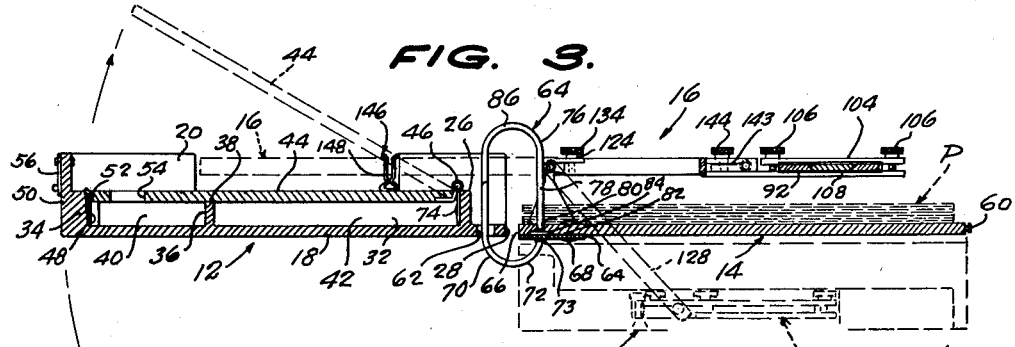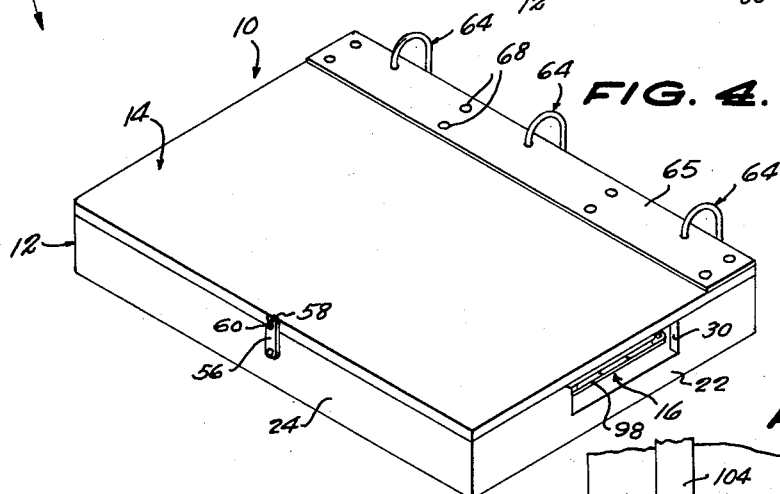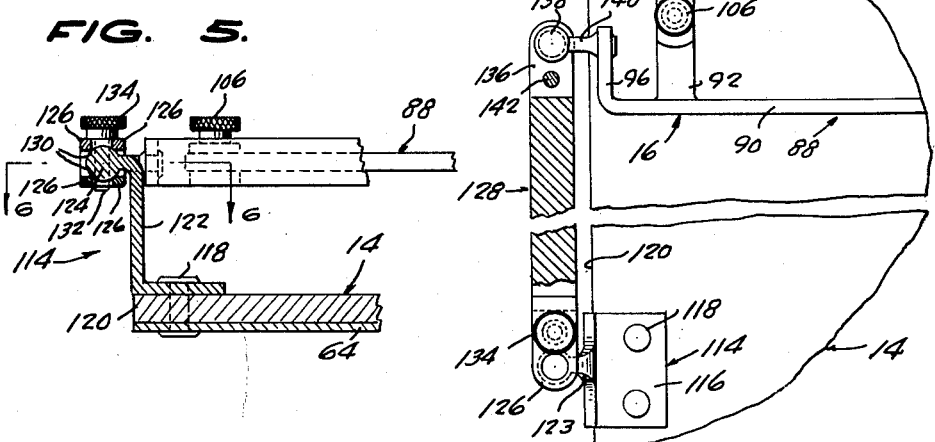

United States Patent Office 3,133,631
Patented May 19, 1964

3,133,631
CASE AND SLIDE RULE HOLDER THEREON
Charles E. Bolden, 3287 15th Place SE., Apt. 203,
Washington 20, D.C.
Filed Sept. 22, 1961, Ser. No. 140,007
11 Claims. (Cl. 206—16)

This invention relates to the general field of loose-leaf notebooks and, more specifically, the instant invention pertains to accessories therefor.

It is, of course, a well-known fact that calculations made from slide rules are dependent entirely upon the accuracy of the scales employed, the accuracy of the setting of the slide bar relative to the fixed scales, and the accuracy with which the hairline slide is set on the rule for observation by the user. Thus, every accommodation which can be made should be afforded to the user of a slide rule.

Difficulties are frequently encountered in the use of a slide rule, especially in cramped conditions, as by a student using a desk in a classroom. It is well-known that the supportive surface of a conventional desk has, in most cases, insufficient area to accommodate a slide rule, its case, and accessories, such as test and note paper, technical books, drafting instruments, and similar paraphernalia, without the likelihood of these objects being knocked off the desk.

In the case of a slide rule, the dropping of the same after adjustments of the slide bar and/or the hairline slide have been made, or even placing of the adjusted slide rule on the desk among or apart from other accessories, may result in the disturbance of the slide rule adjustments and/or of the proximate accessories. This, of course, leads to inaccurate readings, and time is wasted in effecting readjustments of the slide rule in order to obtain the desired calculation.

Further, as a general rule, adjustments of the slide rule require the use of both hands, and consequently, valuable time is lost for the making of notes and the recording of calculations due to the fact that the slide rule must be placed down or held in one hand in order for the user to write. Additionally, more time is lost by the user since his eyes must stray from the slide rule when recording his calculations and in such instances, the eyes have difficulty in again adjusting to the slide rule readings when they are returned to the slide rule.

The above résumé briefly sets forth some of the reasons for lost time occasioned during the operation of a slide rule and the causes therefor. The same could be extended indefinitely, but for the purposes of high-lighting the instant invention, these facts are deemed to be sufficient.

It is, therefore, one of the primary objects of this invention to provide, in combination, a notebook together with a holder for a slide rule which serves to eliminate the above-outlined difficulties by combining in a single compact unit a notebook case which is composed of hinged sections, and a slide rule holder which is pivotally and rotatably mounted on one of the sections, the holder being so constructed as to be swingable to enclose the slide rule between the case sections when the case sections of the notebook are closed in registered relation, and swingable to support the slide rule in elevated position when the case sections are open.

A further object of this invention is to provide a slide rule holder, in combination with a notebook or carrying case, the slide rule holder comprising a frame which is reversible to permit the reading of opposite sides of the slide rule and movable to place the slide rule in out-of-the-way positions.

Another object of this invention is to provide, in combination, a notebook or case together with a slide holder frame wherein the frame may be pivoted relative to the case without disturbing adjustments of the slide bar or the hairline slide of the slide rule and, wherein the adjustments of the slide bar and/or the hairline slide may be made with one hand, the other hand being left free for making notes of readings of the slide rule or engaged in other writings or operations.

Still another object of this invention is to provide a case or notebook with means for securing the slide rule frame and the slide rule mounted therein against movement when the case is in either its open or closed condition.

A still further object of this invention is to provide a notebook or notebook case with a door-closed compartment for accessories such as, for example, pencils, paper, mathematical table sheets, protractors, scales, pencil sharpener, and the like.

This invention contemplates, as a still further object thereof, the provision of a notebook or case of the type generally defined supra, wherein the sections of the case may be folded into superimposed relationship, so as to provide a writing desk which occupies a minimum of space upon a suporting surface, such as a classroom desk.

Other and further objects and advantages of the instant invention will become more evident from a consideration of the following specification when read in the light of the accompanying drawings, in which.

Figure 2:
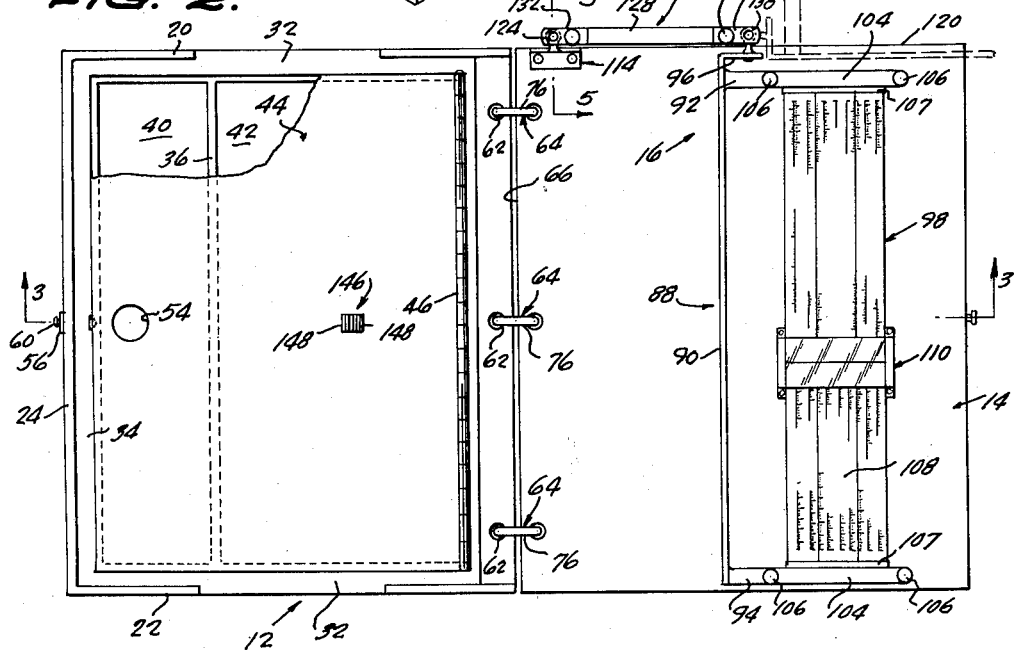
FIGURE 2 is a top plan view of FIGURE 1, partly broken away, and showing the slide rule frame and its connected slide rule moved to an out-of-the-way position in phantom lines.

FIGURE 3 is a vertical longitudinal cross-sectional view, FIGURE 3 being taken substantially on the horizontal plane of line 3—3 of FIGURE 2, looking in the direction of the arrows, FIGURE 3 showing the door of the accessory compartment in closed position in solid lines and in open position in phantom lines, FIGURE 3 showing, in solid lines, one of the sections of the case in its normal unfolded position and showing the same section, in phantom lines, as being folded beneath the other of the case sections, in order to provide a writing desk, and writing paper stacked upon said other section;

FIGURE 4 is a perspective view of the loose-leaf notebook or carrying case in its closed position;

FIGURE 5 is an enlarged fragmentary detail cross-sectional view, FIGURE 5 being taken substantially on the vertical plane of line 5—5 of FIGURE 2, looking in the directions of the arrows; and FIGURE 6 is a contracted, fragmentary detail cross-sectional view, FIGURE 6 being taken substantially on the horizontal plane of line 6—6 of FIGURE 5, looking in the direction of the arrows.

Referring now more specifically to the drawings, wherein like numerals designate like parts throughout the several views, reference numeral 10 designates, in general, a substantially rectangular notebook or carrying case which includes a tray section 12, a cover section 14, and a slide rule holder frame assembly 16 supported on the cover section 14.

The tray section 12 comprises a bottom wall 18, similar upstanding end walls 20, 22 disposed in substantially parallel relationship, one to the other, and secured to the marginal edges of the bottom wall 18, a full-height, full-length outer side wall 24, and a low-height, full-length inner side wall 26 which extends parallel to the side wall 24 and is located near to, but spaced inwardly from the inner side edge 28 of the bottom wall 18. The end walls 20, 22 are provided, intermediate their ends, with notches 30 that extend downwardly from their upper edges as far as the battens 32, the latter extending along the inner sides of the end walls. A similar batten 34 extends along the inner side of the outer side wall 24. As is clearly shown in FIGURES 2 and 3, a partition wall 36 rises from the bottom wall 18, the partition wall 36 extending between the outer and inner side walls in laterally-spaced relation relative thereto, and its upper edge 38 is spaced below the upper edges of the battens 32, 34. The partition wall 36 divides the tray section 12 into two isolated accessory-carrying compartments 40 and 42, respectively.

Reference numeral 44 denotes a cover for closing the accessory compartments 40, 42, the cover 44 comprising a substantially flat rectangular plate having a side thereof hinged, as indicated at 46, to the inward side of the inner side wall 26, so as to fit between the battens 32, 34 and to rest upon the upper edge of the partition wall 36 when the cover 44 is moved to its closed position, as shown in FIGURE 3. Means for releasably securing the cover 44 in its closed position is provided and comprises a spring catch 48 suitably secured to the inner side of the outer side wall batten 34, the spring catch 48 having a detent 50 on its upper end which normally engages in a recess 52 formed in the free side edge of the cover 44. A finger hole 54 is provided in the cover adjacent its free side edge.

A swing catch 56 is pivoted on the outer side of the outer side wall 24 and has a hook 58 which is adapted to be engaged over a headed stud 60 on the free edge of the cover section 14, in the closed condition of the notebook or carrying case 10.

The bottom wall 18 of the tray section 12 is provided, outwardly of the inner side wall 26, with longitudinally-spaced transversely-extending holes 62 which severally and loosely receive one side member of a plurality of hinge loops 64, the other sides of the loops 64 being fixedly connected to the cover section 14 of the notebook or carrying case 10 by conventional means.

The cover section 14 is seen to comprise a substantially flat rectangular plate having substantially the same outside dimensions as the tray section 12. The cover section 14 includes a reinforcing strap 65 which extends along its inner side edge 66, and is suitably secured to the exterior side of the cover section, as indicated at 68 in FIGURES 3 and 4.

Again referring to FIGURE 3, the hinge loops 64 are seen to comprise lower stationary J-shaped members 70 whose crooks 72 extend laterally outwardly beyond the inner side edge of the tray section 12 and are suitably fixed, at their free ends, as indicated at 73, to the underside of the reinforcing strap 65. The standards 74 of the members 70 extend upwardly through the holes 62 of the tray section 12. The loops 64 further comprise upper, inverted J-shaped members 76 whose vertical standards 78 extend downwardly and rotatably through openings 80, formed in the cover section 14, in line with the free ends of the crooks 72 of the lower loop member 70. The underside of the cover section 14 is also provided with a plurality of enlarged diameter openings 82 which are in open communication with the openings 80, and in which are rotatably confined enlarged diameter beads 84 on the lower ends of the standards 78, whereby the loop members 76 are rotatable relative to the lower loop members 70. The down-turned crooks 86 of the upper loop members 76 have beveled free ends to engage with the beveled upper ends of the standards 74 of the lower loop members, in a well-known manner, so that the crooks 86 are aligned with the standards 78, in the closed condition of the loops 64. When the carrying case sections 12, 14 are opened, and the upper loop members 76 are swung to their open positions, loose-leaf note paper P can be engaged on the loops and laid upon the cover section 14, as shown in FIGURE 3, to the convenience of the writer or user when engaged in writing.

The slide rule frame assembly 16 is seen to comprise a substantially U-shaped frame 88 having an elongated bight portion 90 from which projects relatively short parallel lateral legs 92, 94, the leg 94 being at one end of the bight portion 90, and the leg 92 being disposed close to, but spaced from the other end of the bight portion, the aforementioned other end of the bight portion 90 having projecting laterally therefrom a short arm 96 which parallels the leg 92 in spaced relation relative thereto. The bight portion 90 is located in a plane perpendicular to the planes of the legs 92, 94, so that when the assembly 16 overlies the cover section 14, the legs 92, 94 are parallel to the adjacent surface thereof and the bight portion 90 is in a vertical plane perpendicular thereto.

The frame 88 further comprises clamping bars 104 which overlie and extend along the legs 92, 94, and are clampably connected thereto by means of clamping screws 106 which extend through the ends of the bars 104 and are threaded into the legs 92, 94. The slide rule 98 is of conventional form and has across its ends, upper and lower end plates 107 which are clamped between the bars 104 and the frame legs 92, 94, so that the clamping of the slide rule does not interfere with the free endwise movement of the slide bar 108 of the slide rule, or the free movement of the hairline slide 110 thereof.

The frame 88 is supported on the cover section 14 by means of a lockable universal joint assembly, generally designated by reference numeral 112, which is connected to the slide rule frame arm 96. The universal joint assembly 112 includes an upstanding L-shaped bracket 114 (see FIGURES 1, 2, 5 and 6) whose foot portion 116 is affixed, as indicated at 118, upon the upper surface of the cover section 14, at a location along the upper edge 120 thereof, and adjacent the inner side edge 66 thereof. The upright 122 of the bracket 114 terminates in a laterally-projecting arm 123 having a ball 124 at its upper outer end. The opposite sides of the ball 124 are rotatably engaged in clevis arms 126 at one end of an elongated strut 128. The clevis arms 126 have socket holes 130 formed therein to receive the aforementioned opposite sides of the ball 124, so as to constitute the universal type ball-and-socket joint. A clamping screw 132 is threaded through the clevis arms 126 and is provided with a knurled knob 134 at one end. The screw 132 is adapted to be tightened so as to lock the strut 128 in any desired rotated position on the ball 124.

The other end of the strut 128 remote from the clevis arms 126 is formed with clevis arms 136 which are similar thereto. The clevis arms 136 embrace a ball 138 (see FIGURE 6) which is carried on the outer end of a stem 140, the latter being affixed to and extending laterally and outwardly from the slide rule frame arm 96. As before, a clamping screw 143 is threaded through the clevis arms 136 for clamping the same against opposite sides of the ball 138, and the screw 142 is provided with a knurled knob 144 on one end thereof.

Reference numeral 146 designates, in general, an upstanding spring clamp having arms 148 disposed in side-by-side relation and connected to a bight portion 150, the latter being fixedly secured to the cover 44. The spring clamp 146 is designed to receive the bight 90 between the arms 148 thereof when the strut 128 is rotated substantially 180 degrees from its position shown in FIGURES 1, 2 and 3. This releasably secures the slide rule frame assembly 88 to the cover 44 when the slide rule is not in use, and the case 10 is in its opened and flattened condition.

Figure 1:
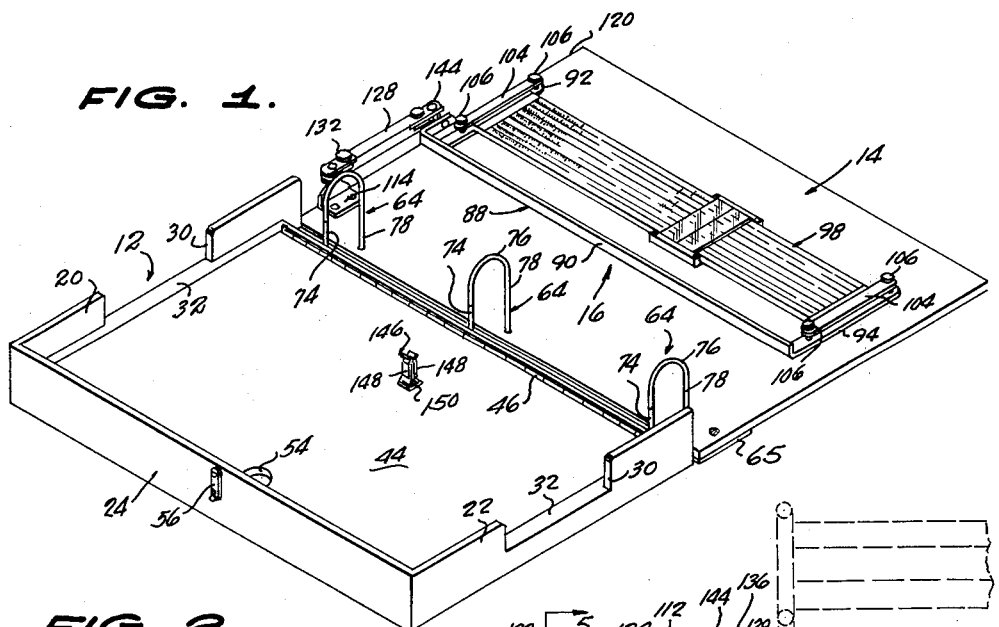
FIGURE 1 is a perspective view of a loose-leaf notebook or carrying case shown in open position together with the slide rule holding frame and the slide rule overlying one section of the case.

Referring now to FIGURE 1 of the drawings wherein the case 10 is shown as being in its open flat position with the slide rule 98 extending substantially parallel to the paper P and cover section 14, it is important to note that the position of the slide rule 98 and its frame 88, as shown in FIGURE 1, comprises only one of an infinite number of positions that the slide rule and the frame may assume at any given time.

Let it now be assumed that the user desires to make certain calculations with the slide rule 98. The screws 132 and 142 are loosened to permit the strut 128 to be moved to any desired angle with respect to the cover section 14, and the screws are subsequently tightened when the slide rule has been moved to such a position that the user can usually and comfortably operate the slide bar 108 with his eyes adjusted to the scale computations. In selecting the position of the frame assembly 88 and the slide rule 98 it will be recognized, of course, that these elements should not be positioned relative to the paper P so that they would interfere with the user's entry thereon of the calculations made through the use of the slide rule 98. When the slide rule calculations have been completed, and assuming that the user has no further use of the slide rule, the strut 128 and the slide rule assembly frame 88 may be pushed aside or rotated so that the frame 88 is superimposed over the cover 44 in such a manner as to cause the bight 90 to engage within the spring clamp 146, thereby clearing the paper P for further note-taking while also preventing inadvertent damage to the slide rule since the same is now housed within the walls of the tray section 12.

Now, if the case 10 is to be closed to assume the position shown in FIGURE 4, and assuming that the bight 90 is engaged with the clamp 146, the bight is first disengaged therefrom and the frame 88 and slide rule 98 are moved substantially to the position shown in FIGURE 1. Thereafter, the cover section 14 is swung over the down-turned crooks 86 of the upper loop members 76 until the cover section 14 engages against the upper edges of the side walls of the tray section 12. It should be noted that with the cover section 14 in its closed position, the bight 90 is not engaged within the spring clamp 146, but instead, lies between the same and the side wall 24, and the slide rule frame assembly 88 is superimposed over the cover 44. The hook 58 is now engaged with the stud 60.

When closing the case 10, and assuming that the slide rule 98 and its frame are disposed in some adjusted position wherein the bight 90 is not engaged within the spring clamp 146, it is only necessary to fold the strut 128 and the frame assembly 88 to substantially the position shown in FIGURE 1, after which the above operations for closing the case 10 may be carried out without interference.

It has been noted above that one of the objects of this invention is to provide a writing case or notebook assembly which is adapted for use wherein there is a very limited area available as a support for the case 10. Under these conditions, the tray section 12 may be swung around the hinge loops 64 to fold against the cover section 14, thereby assuming the dotted-line position shown in FIGURE 3. The tray section 12 may now serve as a writing table or stand, and the slide rule 98 is still available for use.

With the tray section 12 so folded beneath the cover section 14, and assuming that there is no immediate use for the slide rule 98, the strut 128 is rotated substantially 360 degrees to swing the slide rule frame assembly 88 into its dotted-line position shown in FIGURE 3, and in such a manner as to cause the bight 90 to engage within the spring clamp 146. Thus, while the slide rule 98 is immediately available, should the need arise, the same is protected in this position from damage since it is again wholly surrounded by the tray section 12.

To return the case 10 to its closed position, the bight 90 is first disengaged from the spring clamp 146 and rotated substantially to the position shown in FIGURE 1, after which the case 10 may be closed, as before.

Having described and illustrated one embodiment of this invention in detail, it will be understood that the same is offered merely by way of example, and that this invention is to be limited only by the scope of the appended claims.

What is claimed is:

1. Slide rule holding means comprising a normally horizontal support, a substantially U-shaped slide rule frame assembly, said frame assembly comprising a bight having an arm projecting laterally from the opposed ends thereof, means on said arms to releasably secure the opposed ends of said slide rule thereon with said slide rule extending therebetween, a strut, universal joint means connecting one end of said strut with said horizontal support adjacent a side thereof, and universal joint means connecting the other end of said strut with one end of said bight, said two universal joint means being operable to move said frame to adjusted positions over and beyond said support and to permit said frame to be swung, selectively, relative to said strut to expose the opposed sides of said slide rule.

2. A slide rule holding assembly comprising a horizontal support, a slide rule holding frame assembly comprising a frame having first and second ends, a slide rule mounted on said frame and extending between its said ends, and swivel means fixed to said first end of said frame and to said support and providing for movement of said frame assembly relative to said support and for positioning said assembly beyond said support, said swivel means comprising a first ball extending from said frame adjacent to said first end, a strut having a first socket on one end embracing said first ball, said strut having a second socket on the other end thereof, a fixed bracket upstanding from said support having a second ball spaced above said support and embraced by said second socket, first clamping means for said first socket and said first ball for holding said frame in adjusted position relative to said strut, and clamping means for said second socket and said second ball to hold said strut in adjusted position relative to said support.

3. A slide rule holding assembly comprising a horizontal support, a U-shaped frame having first and second ends, a slide rule mounted on said frame and extending between its said ends, swivel means fixed to said first end of said frame and to said support for positioning said assembly above and beyond said support, a case comprising a tray section and a cover section, said cover section being said support, and means hinging the cover section on said tray section for closing said tray section and enclosing said U-shaped frame in said tray section.

4. A slide rule holding assembly comprising a horizontal support, a slide rule holding frame having first and second ends, means on said ends for releasably securing the opposed ends of a slide rule thereon with said slide rule extending therebetween, swivel means fixed to said first end of said frame and to said support for positioning said assembly in adjusted position relative to said support, a case comprising a tray section and a cover section, said cover section being said support, means hinging said cover section on said tray section for closing said tray section and enclosing said frame, and spring clamp means on said tray section engageable with said frame to releasably hold said frame in place in said tray section.

5. A slide rule holding assembly comprising a horizontal support, a slide rule holding frame having first and second ends, means on said first and second ends for releasably securing the opposed ends of a slide rule thereto, said slide rule extending between said first and second ends, swivel means fixed to said first end of said frame and to said support for adjustably positioning said assembly relative to said support, a case comprising a tray section and a cover section, said cover section being said support, means hinging the cover section on the tray section for closing said tray section and enclosing said frame, detent means on said tray section engageable with said frame for holding said frame in place in said tray section, said tray section having upwardly-opening accessory compartment means, a cover hinged on said tray section for closing said compartment means, and means for securing the cover releasably in closed position, said detent means being on said cover.

6. A slide rule holder comprising a horizontal support, a slide rule holding assembly comprising a frame having first and second ends, means on said ends releasably securing the opposed ends of a slide rule thereon, said slide rule extending between said ends of said frame, swivel means fixed to said first end of said frame and to said support for positioning said frame in adjusted position relative to said support, a case comprising a tray section and a cover section, said cover section being said support, means hinging the cover section on said tray section for closing said tray section and enclosing said frame, said hinge means comprising holes spaced along the laterally-inward side of said tray section, vertical oblong hinge loops having one side extending loosely through said holes and having another side fixed to said cover section at the laterally-inward edge thereof whereby said tray section may be folded against said support to serve as a table therefor and a receptacle for said frame when swung thereunder, and spring clamp means to releasably engage said frame when swung to this position to hold said frame in said tray section.

7. A slide rule holder comprising a horizontal support, a slide rule holding assembly comprising a frame having first and second ends, means on said ends to releasably connect the opposed ends of a slide rule thereto for extension between said first and second ends, swivel means connected to said first end of said frame and to said support for adjustably positioning said frame relative to said support, a case comprising a tray section and a cover section, said cover section being said support, means hinging said cover section on said tray section for closing said tray section and enclosing said frame, hinge means including holes spaced along the laterally-inward side of said tray section, vertical oblong hinge loops having one side extending loosely through said holes and having another side fixed to said cover section at the laterally-inward edge thereof, said loops comprising erect lower J-shaped sections having standards rising through said holes and crooks fixed to the underside of said cover section, and upper inverted J-shaped sections having standards rotatably secured at their lower ends to the cover section and crooks having free ends, the upper sections being normally positioned with the free ends of their crooks engaged with the upper ends of said standards of the lower loop sections.

8. A slide rule holder comprising a horizontal support, a slide rule holding frame having first and second ends, means on said first and second ends for releasably connecting the opposed ends of a slide rule thereon, said slide rule extending between said first and second ends, swivel means fixed to said first end of said frame and to said support for adjustably positioning said frame relative to said support, a case comprising a tray section and a cover section, said cover section being said support, means hinging the cover section on said tray section for closing said tray section and enclosing said frame, said tray section being engageable with the underside of the cover section to provide a writing desk.

9. In combination, a slide rule carrying case and holding frame assembly for said slide rule, said case comprising a tray section having a bottom wall, opposed pairs of end walls and a side wall, a cover section coextent with said tray section when said cover member is in its normally closed position, said cover section being spaced from said bottom wall, hinge means connecting a side of said cover section with said tray section at that side thereof oppositely-disposed with respect to said side wall, said tray section being separable from said cover section for pivotal movement about said hinge means until said bottom wall engages said cover section and said tray section becomes a writing table, a cover extending across said tray, means hingedly connecting said cover on said tray section, spring clamp means on said cover and projecting in a direction outwardly of said tray section, a substantially open slide rule holding frame having a pair of opposed ends, means on said ends to releasably secure the opposed ends, respectively, of the slide rule, a strut, universal means connecting one end of said strut with said cover section adjacent an end thereof, and universal means connecting the other end of said strut with said frame, said universal means enabling said frame to be folded into said tray for storage therein when said cover section is engaged by said bottom wall, said spring clamp means engaging a portion of said frame to retain said frame in said tray section when said cover section is engaged by said bottom wall.

10. In the combination recited in claim 9, wherein said slide rule holding frame comprises a substantially U-shaped frame member including a bight having a pair of arms projecting laterally therefrom at its opposed ends, and said clamping means are disposed on said arms.

11. In the combination recited in claim 10, wherein said universal connecting means comprise a standard fixedly secured to said cover section adjacent an end thereof, said standard having a ball fixedly secured to the other end thereof, a strut having a socket formed on each end thereof, said strut having one of its ends engaged about said ball, a strut member fixedly connected to said bight adjacent one of said arms, a ball mounted on said strut, said strut, at its other end, engaging about said last-named ball, and means for clamping said strut in adjusted positions relative to said cover section and said frame.

References Cited in the file of this patent

UNITED STATES PATENTS

| | | |
|---|---|---|
| 982,085 | Nicholson | Jan. 17, 1911 |
| 1,009,493 | Ettler | Nov. 21, 1911 |
| 1,997,640 | Huff | Apr. 16, 1935 |
| 2,190,472 | Ferrughelli | Feb. 13, 1940 |
| 2,211,660 | Kidd | Aug. 13, 1940 |
| 2,464,690 | Ketchem | Mar. 15, 1949 |
| 2,897,032 | Kremer | July 28, 1959 |

FOREIGN PATENTS

| | | |
|---|---|---|
| 11,030 | Great Britain | 1914 |
| 521,097 | Germany | Mar. 1, 1930 |